United States Patent [19]

Long

[11] Patent Number: 5,768,424
[45] Date of Patent: Jun. 16, 1998

[54] COMPRESSION FACTOR ADJUSTMENT TO FACILITATE IMAGE DISPLAY

[75] Inventor: Timothy Long, West Pymble, Australia

[73] Assignee: Canon, Inc., Tokyo, Japan

[21] Appl. No.: 180,321

[22] Filed: Jan. 12, 1994

[30] Foreign Application Priority Data

Jan. 15, 1993 [AU]  Australia .................................. PI6834

[51] Int. Cl.⁶ .............................. G06K 9/36; G06K 9/46
[52] U.S. Cl. ...................... 382/232; 382/233; 358/426; 348/384
[58] Field of Search ............................ 348/390, 398, 348/419, 420, 424, 384, 404, 405; 382/1, 49, 54, 56, 232, 233, 235, 239, 250; 358/261.2, 261.3, 430, 432, 426, 433; 364/715.02

[56] References Cited

U.S. PATENT DOCUMENTS

| | | | |
|---|---|---|---|
| 4,394,774 | 7/1983 | Widergrn et al. ........................ | 382/56 |
| 5,040,233 | 8/1991 | Davy et al. ........................... | 382/239 |
| 5,051,840 | 9/1991 | Watanabe et al. ...................... | 358/433 |
| 5,101,280 | 3/1992 | Moronaga et al. ....................... | 358/426 |
| 5,121,216 | 6/1992 | Chen et al. ........................... | 358/361.3 |
| 5,122,873 | 6/1992 | Golin ................................. | 348/390 |
| 5,126,842 | 6/1992 | Andrews et al. ....................... | 358/133 |
| 5,228,098 | 7/1993 | Crinon et al. ......................... | 382/240 |
| 5,287,420 | 2/1994 | Barrett .............................. | 382/233 |

FOREIGN PATENT DOCUMENTS

| | | |
|---|---|---|
| 0382892 | 8/1990 | European Pat. Off. . |
| 0417943 | 3/1991 | European Pat. Off. . |
| 0487282 | 5/1992 | European Pat. Off. . |

*Primary Examiner*—Leo Boudreau
*Assistant Examiner*—Bhavesh Mehta
*Attorney, Agent, or Firm*—Fitzpatrick, Cella, Harper & Scinto

[57] ABSTRACT

Most output display devices such as printers and displays require certain minimum timings for delivery of data to be displayed. The use of compressed image stores as input to these displays requires that the image be decompressed within the minimum time limits as required by the display. The present invention discloses an effective method for ensuing that these minimum timings are met through the division of the image into bands (B1,B2, ... Bn) and the recompression of those bands that fail to meet the minimum timing requirements of the output display device.

28 Claims, 6 Drawing Sheets

COMPRESSION FACTOR ADJUSTMENT TO FACILITATE IMAGE DISPLAY

The present invention relates to the display of compressed images on a synchronous output device such as a colour computer display and/or colour printers, and, in particular, to the display of colour images on a raster colour display apparatus.

BACKGROUND ART

Figure 1:
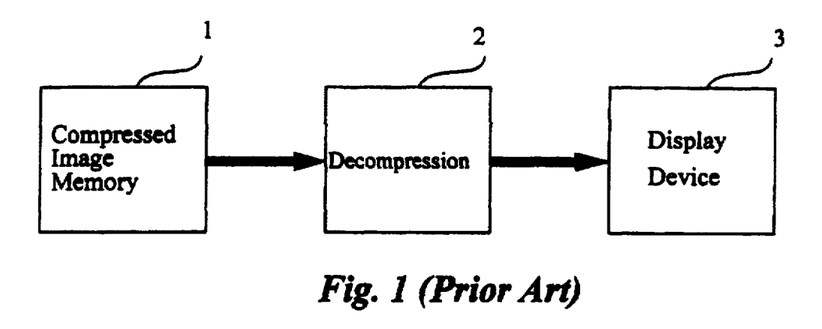
FIG. 1 illustrates a first example of decompression method for displaying a compressed image.
Figure 2:
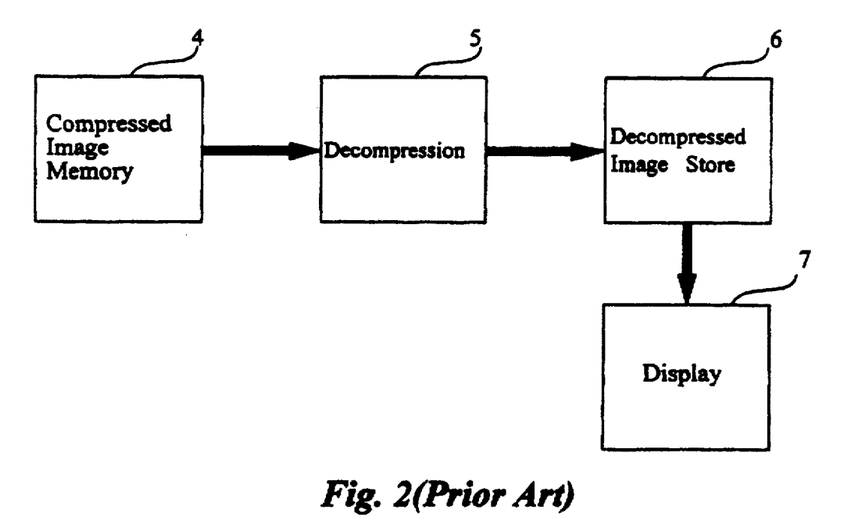
FIG. 2 illustrates a second example of decompression method for displaying a compressed image.

Some attributes of the prior art will now be discussed with reference to FIG. 1 and FIG. 2 in which:

FIG. 1 illustrates a first example decompression method for displaying a compressed image, and FIG. 2 illustrates a second example decompression method for displaying a compressed image.

FIG. 1 illustrates a compressed image memory 1 that holds a compressed image which is decompressed by a decompression apparatus 2 in a pipeline fashion with the output being forwarded for display on a display device 3. Often the display device has certain display requirements, such as, for example, each pixel of a given line having to be forwarded to the display device 3 within a minimum time period for the display to function properly. For example, such is the case in rasterised displays.

If the decompression of a particular portion of the compressed image takes longer than the maximum time period for the forwarding to the display device 3, then the compressed image will not be able to be displayed according to the method used in FIG. 1 as it will not be decompressed in time. In a display device 3 which requires synchronous input of uncompressed data it is necessary to maintain a consistent output data rate from the decompression process. It has been found that if the volume of compressed data is too large, then it is not possible to successfully decompress all the data at the data rate required for real time operation. Thus, the synchronous nature of the system cannot be maintained and the image cannot be successfully displayed.

Referring now to FIG. 2 there is shown a second example decompression method for displaying a compressed image. This method uses a batch arrangement designed to overcome the problems of the first method by decompressing, using a decompression apparatus 5, a compressed image stored in a compressed image memory 4, and storing the decompressed image in a decompressed image store 6, which can then be forwarded to a display device 7 within the time requirements. However, this method fails to use the advantages of a compressed frame store as the entire image must be decompressed first and a large storage means is required to store the decompressed image before it is forwarded to the display device 7. The need for such a large storage means often results in an undesirable and significant increase in expense of a corresponding computer graphics system using such an arrangement.

SUMMARY OF THE INVENTION

It is an object of the present invention to provide a means for decompressing a compressed image wherein the compressed image will always be decompressed within the real time requirements for the display on a display device.

In accordance with a first aspect of the present invention, there is provided a method for the real-time display of a compressed image, the method comprising the steps of:

(a) dividing the image into a plurality of bands, (b) compressing each of said bands using a first compression factor, (c) determining those invalid bands that cannot be decompressed within a first predetermined time and if the number of invalid bands is less than a first predetermined number, then filtering each band so that its decompression time is less than said first predetermined time, otherwise if the number of invalid bands is greater than or equal to said first predetermined number, recompressing the whole image with a second compression factor such that each band can be decompressed in a shorter time interval less than said first predetermined time.

In accordance with a second aspect of the present invention, there is provided a method for the real-time display of a compressed image, the method comprising the steps of:

(a) dividing the image into a plurality of bands.

(b) compressing each of said bands using a first compression factor.

(c) determining those invalid bands that cannot be decompressed within a first predetermined time and if the number of invalid bands is less than a first predetermined number, then filtering each band so that its decompression time is less than said first predetermined time, otherwise if the number of invalid bands is greater than or equal to said first predetermined number, recompressing the whole image with a second compression factor such that each band can be decompressed in a shorter time interval and applying step (c) to said recompressed image.

Preferably said filtering includes convolution of an invalid band with a predetermined convolution matrix.

Preferably, said first predetermined number is chosen to be a proportion of the total number of bands in the image.

BRIEF DESCRIPTION OF THE DRAWINGS

A preferred embodiment of the present invention will now be described with reference to the remaining drawings in which.

Detailed Description of the Preferred Embodiment

The preferred method of compression of the image is the compression method as devised by the CCITT/ISO Joint Photographic Expert's Group (JPEG) based on the Discrete Cosine Transform and Huffman encoding processes and published in ISO/IEC JTC1/SC2/WG8 JPEG Technical Specification Rev 5 Jan. 16, 1990.

One implementation of a JPEG processor system has been implemented in silicon by C-Cube Microsystems as the CL550B device. The JPEG method allows the size of the compressed data relative to the uncompressed data to be selected (the compression ratio) and implementations of the JPEG algorithm such as the CL550B require a finite time to decompress a compressed image that has been compressed using the JPEG method.

Figure 3:
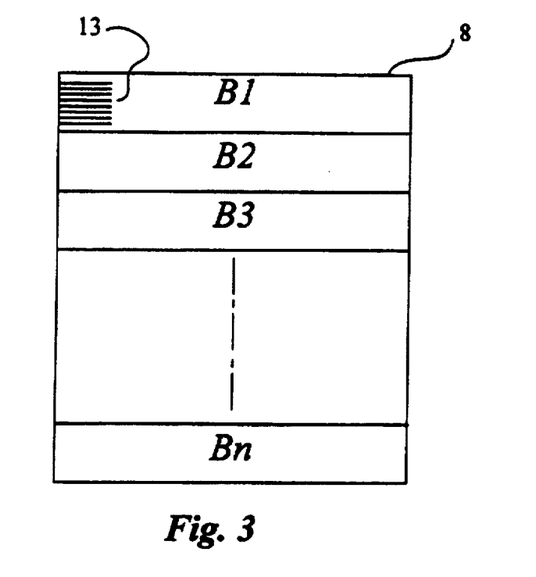
FIG. 3 illustrates an image made up of a number of bands.
Figure 4:
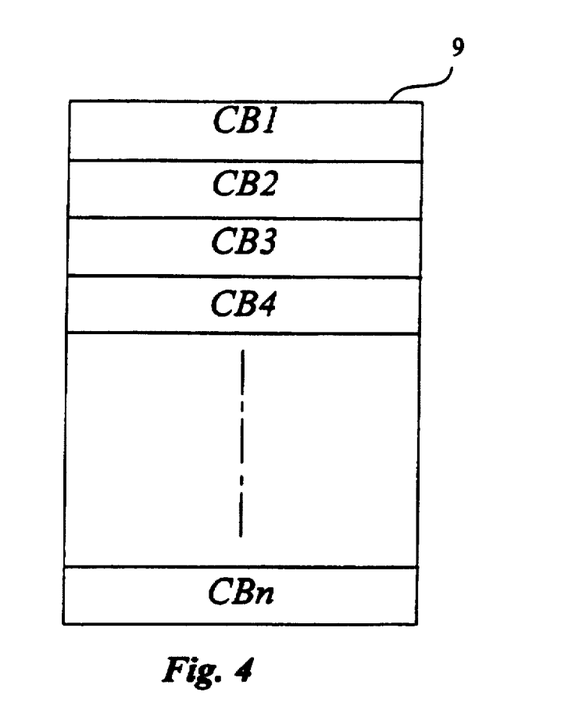
FIG. 4 illustrates the same image as FIG. 3 made up of compressed bands.

Referring now to FIG. 3 and FIG. 4 there is shown an input image 8 (FIG. 3) and its corresponding compressed image 9 (FIG. 4). For the purposes of the preferred embodiment the JPEG compressed image 9 is organized in bands CB1, CB2, CB3 ... CBn, corresponding to fixed size image bands B1, B2, B3, ... Bn in the input image 8. The bands can, for example, contain eight scanlines 13 of image data as in the standard JPEG algorithm and a compressed image is comprised of a large number of compressed bands.

The situation arises that some of these bands may not successfully decompress at the synchronous rate required.

Firstly a determination of those bands of a current image which are bad must be made. A band is considered "bad" if the time taken for it to be decompressed is greater than some predetermined time, that time being the maximum time required to get a band ready to send to a display device, such as a colour printer or video display.

Preferably, if a band has been previously decompressed, the time required to decompress the band is stored with the band itself or in a separate table of all the band decompression times for a current image. If however, there is no timing information available for some or all bands, a test-print operation can be performed in order to determine the band decompression timings.

If the number of bad bands requiring fixing is relatively low, for example less then say 5%, each bad band can be altered so that its decompression time is less than the predetermined time. One method of reducing the decompression time without substantially altering the original bad band is to reduce the amount of high frequency content in the bad band data. This can be achieved by blurring the luminance information, thereby improving the compressibility of the current image. This can be done using a pixel averaging technique such as convolution over a group of pixels.

As the JPEG compressed bad band data cannot be manipulated directly, it is necessary to decompress the JPEG bad band data, perform the convolution operation, and then recompress the data. The overall effect of this is blurring of the image in the bad bands. In the preferred embodiment, image data has the high frequency content of its luminance component reduced by pixel averaging over a certain area.

Figure 5:
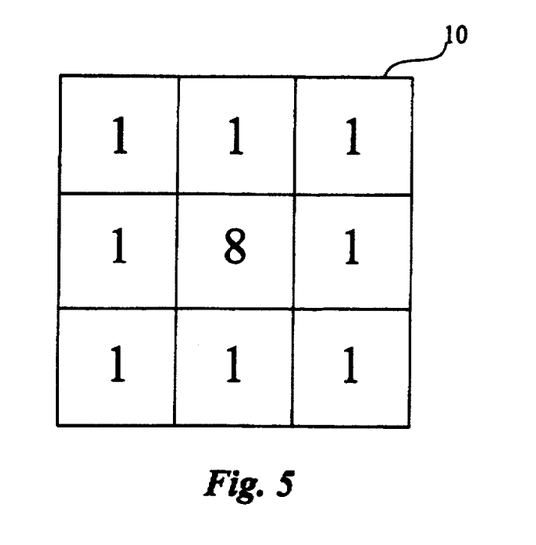
FIG. 5 illustrates a 3×3 convolution matix used in the preferred embodiment.

Referring now to FIG. 5 there is shown a 3×3 convolution matrix 10 used in the preferred embodiment. The convolution matrix 10 consists of a current pixel position containing the value eight (8) and neighbouring pixel elements containing the value one (1).

Figure 6:
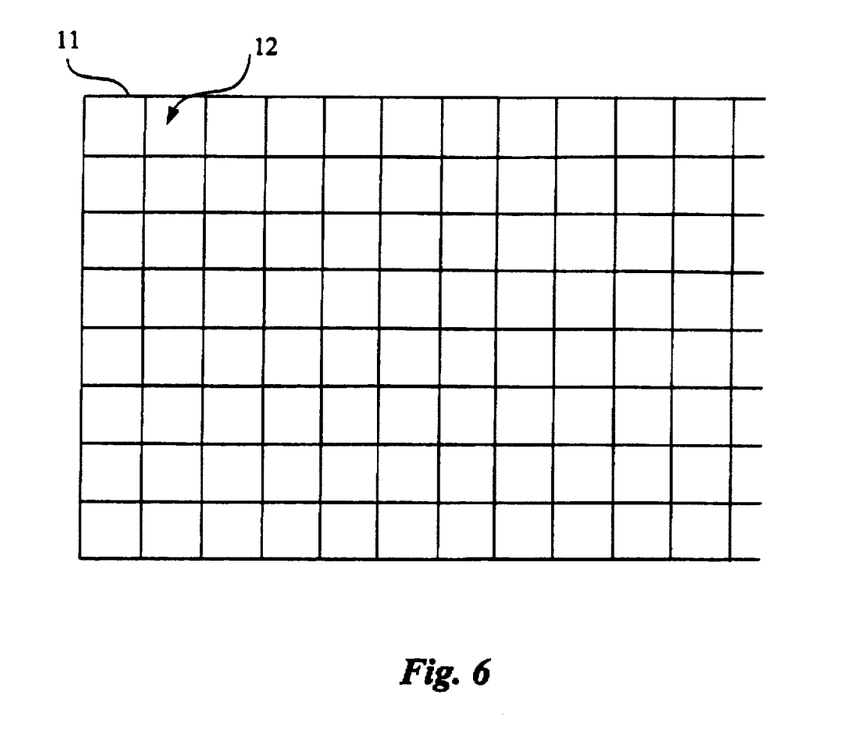
FIG. 6 illustrates an example decompressed band.

Referring now to FIG. 6 there is shown an example of a decompressed band 11. When the convolution matrix 10 of FIG. 5 is applied to the decompressed band 11, each pixel 12 is averaged by multiplying itself by 8 and adding all its neighbours to the result before dividing the new result by 16 and storing it back in the current decompressed band. This particular convolution process has been designed to operate highly efficiently on a binary based digital processor.

If a substantial number of the bands of a current image are bad bands (say greater than 5%), then the entire image can be decompressed and recompressed at a higher compression ratio, which results in a lowering of the quality of the overall image, but an advantageous decrease in decompression time. The decision to recompress the entire image can be made to coincide with situations where the full recompression process will take less time than the blurring of a small number of bad bands in the input image. A higher compression ratio results in a decrease in the decompression time for each given band of the image, thereby reducing the likelihood of the occurrence of bad bands.

Once the image has been recompressed, the process of location of bad bands or further recompression can be applied repeatedly to the current image until a final compressed image is obtained which meets those real-time printing requirements that may be required.

It should be noted that the above process of blurring and recompression are destructive operations in that the image is left permanently altered after a printing or display operation that has had to alter the image. Hence, the saving of the current image (or rendering onto it) after such a print will be saving (or rendering onto) an altered image.

Appendix A shows a pseudo code implementation of the recompression technique of the preferred embodiment for implementation on a computer system. The method disclosed can be implemented on any computer system configured with a display device having certain minimum synchronous display rate requirements as elucidated above.

Referring now to FIGS. 7 to 10, there is shown flowcharts of the pseudo-code of Appendix A.

Figure 7:
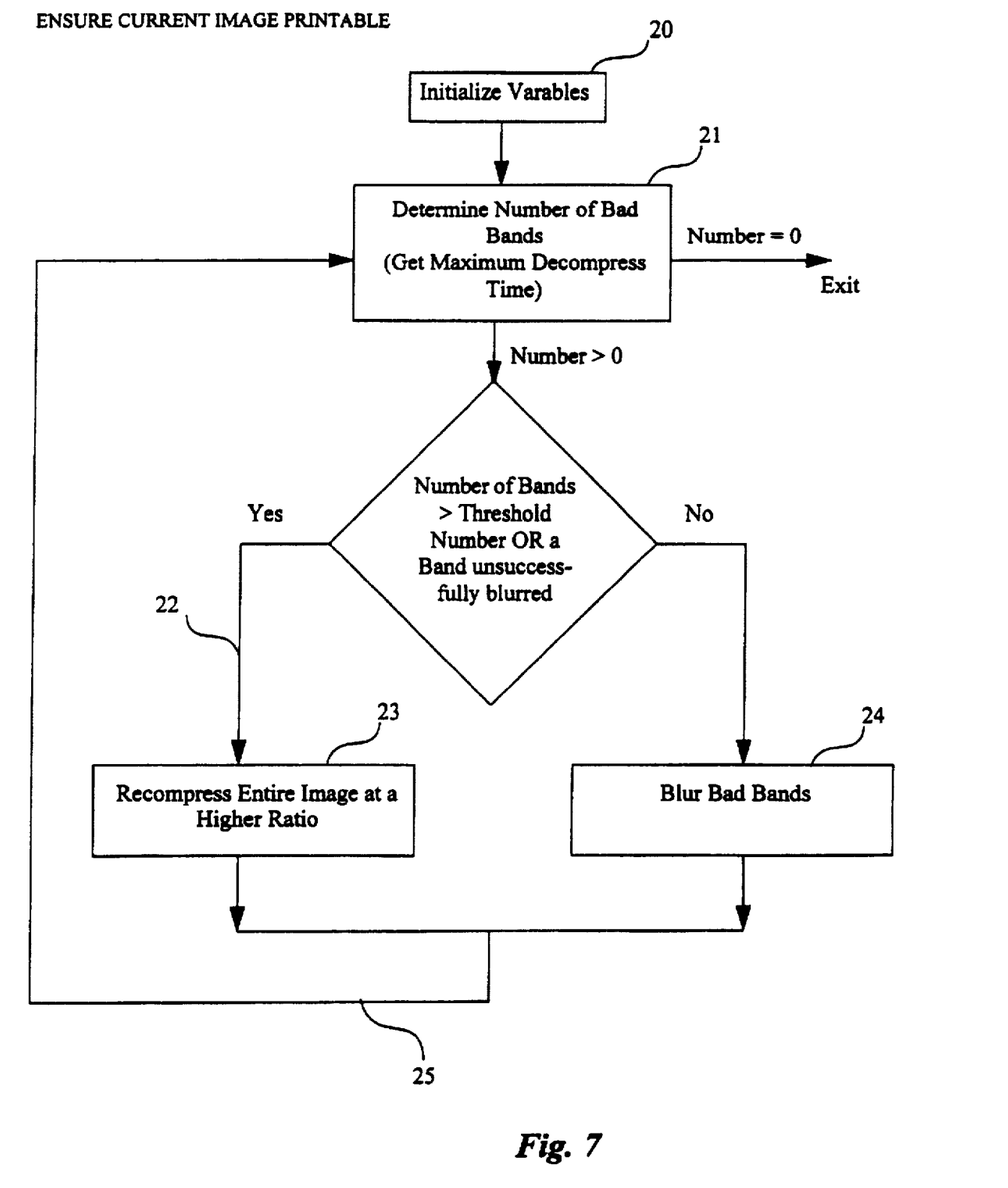
FIGS. 7 to 10 are flowcharts which illustrate the method used in the preferred embodiment.

FIG. 7 shows the overall main program "Ensure Current Image Printable". After initialization of variables 20, a procedure Get Maximum Decompress Time 21 is called to determine the number of "Bad Bands" which cannot be decompressed in time. If the number of bad bands exceeds a predetermined number 22 the entire image is recompressed 23 at a higher compression ratio. Otherwise individual bad bands are blurred 24 to reduce their compression time. The program then enters a return loop 25 to again determine if there are any remaining bad bands.

Figure 8:
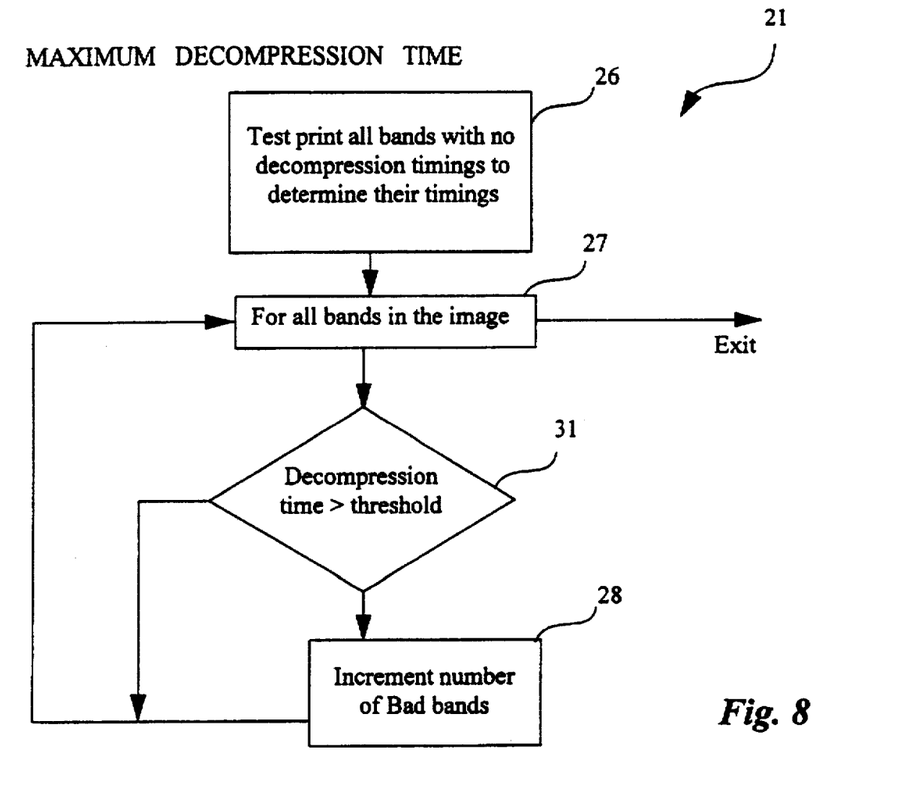

Referring now to FIG. 8, there is shown the procedure Get Maximum Decompress Time 21 of FIG. 7 in more detail. This procedure first performs a test print 26 for all bands for which decompression timings are not available and then, for all bands in the image 27, if the decompression time of the band exceeds a threshold, the number of bad bands (initially set to zero) is incremented.

Figure 9:
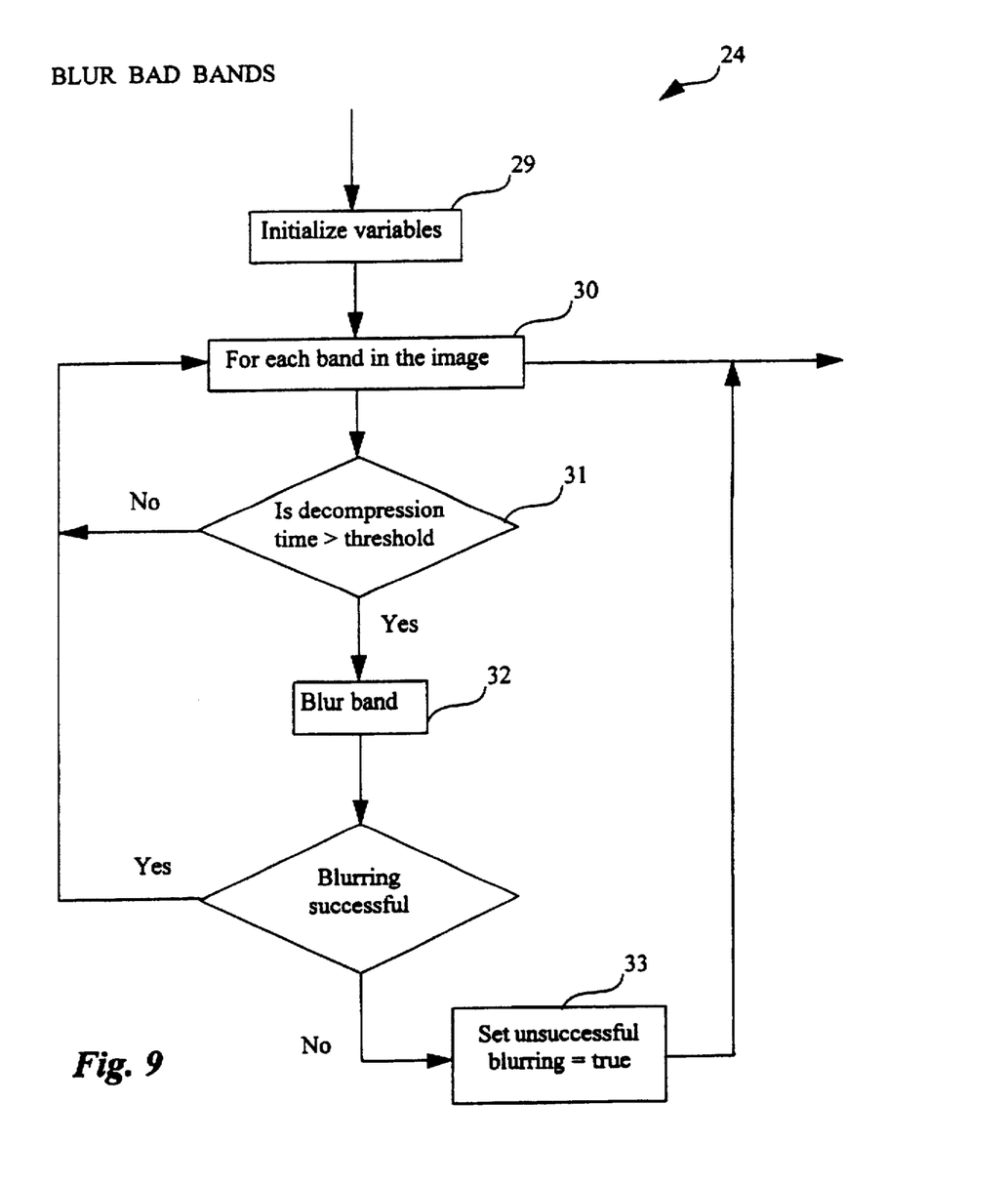

Referring now to FIG. 9, there is shown the procedure Blur Bad Bands 24 of FIG. 7.

After initialization, of the variables 29, each band in the image 30 is checked 31 to determine if it's decompression time exceeds a predetermined threshold. If this is the case then the band is blurred. If the blurring is unsuccessful, the blur band procedure sets unsuccessful blurring to true (thereby causing the image to be recompressed), and exits.

Figure 10:
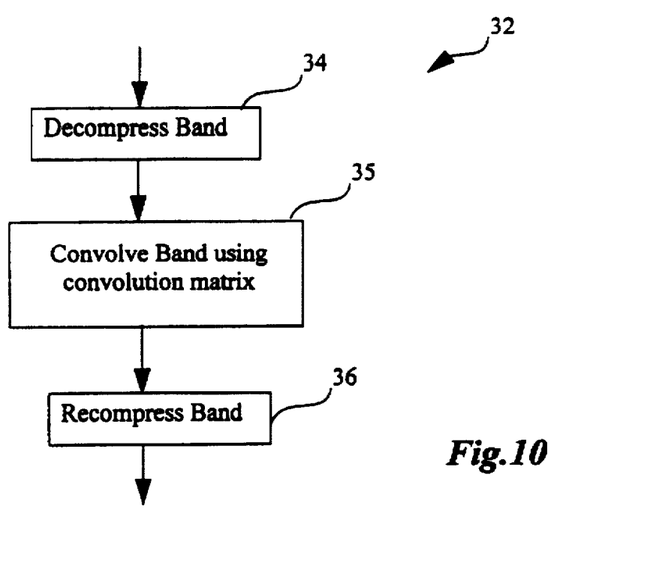

Referring now to FIG. 10, there is shown the procedure Blur Band 32 of FIG. 9 in more detail. The blurring of a band involves the decompression of the band 34, it's convolution of the decompressed band with a convolution matrix previously described 35 and it's recompression 36.

The foregoing describes only one embodiment of the present invention, and modifications, obvious to those skilled in the art, can be made thereto without departing from the scope of the present invention.

APPENDIX A

The following paragraphs set out a pseudo code representation of the preferred embodiment. The main program is set out under the heading 'Ensure Current Image Printable'. This program calls three sub-programs being 'Blur Bad Bands', 'Get Maximum Decompress Time' and 'Blur Band'. These are set out under separate headings.

Ensure Current Image Printable

Given a band-decompress-time threshold, ensure that all those bands in the current image are printable. This means to look at the decompress times (if they exist) and ensure they are less than or equal to the band-decompress-time given. The current image is backed up automatically to make error-recovery easier, but after successful completion the backup is thrown away. Thus any change is permanent.

```
ENSURE CURRENT IMAGE PRINTABLE
    Set the maximum decompress time to zero.
    Set the maximum compress size to zero.
    Reset "compresses are failing" global flag
    Set the number of bands we have to repair to zero.
    (Keep looping until the current image has been altered enough to be
        printable)
    LOOP
        IF need to recompress
        THEN
            CALL RECOMPRESS AT A WORSE QUALITY specifying the
                new reduced quality and returning whether or not further
                recompression is required and, if so, the new quality to apply
            CONTINUE the loop
        ENDIF
        IF GET MAXIMUM DECOMPRESS TIME giving threshold timing
            value returns a non-zero number of bands with bad timings
        THEN
            IF the number of bands exceeding limit <=0.05 * total number
                bands
                THEN
                    (It is required to blur some of the bands)
                    CALL BLUR BAD BANDS giving decompress timing
                        threshold and returning the boolean requirement for further
                        recompress
                ELSE
                    Set need to recompress to TRUE
                    Work out new quality based on maximum decompress timing
                ENDIF
        ENDIF
        IF there is no need to recompress
        THEN
            BREAK the loop
        ENDIF
    ENDLOOP
    RETURN CURRENT IMAGE PRINTABLE
END ENSURE CURRENT IMAGE PRINTABLE
```

(1)Note that if the current image does not currently have a defined quality value (eg, we've loaded it from an external file) then it is required to guess one based on, say, the Q factor. If the quality is already zero it is required to return an error "cannot print even at zero quality"
(2)The 5% value is a config file parameter.

Blur Bad Bands

Given a band decompress timing threshold, blur the content of any band that has a decompress timing greater than the nominated threshold. If any band after blurring *still* has bad decompress timing, report this to our caller as a setting of "need to recompress" along with a new quality.

```
BLUR BAD BANDS
    Set "need to recompress" to FALSE
    Reset any "compresses are failing" global flag
    Set "max compress size" to zero
    CALL CREATE NEW CURRENT IMAGE indicating to leave the
        quality unchanged.
    Allocate a new band that can contain an entire decompressed
        band of the current image.
    FOR all bands in the current image
        IF the band exists and has a decompress-time larger than the
            band decompress timing threshold given
        THEN
            CALL BLUR BAND giving the band number in the current
                image
                and the newly allocated band.
            IF compresses are failing
                OR
                the band decompress timing is larger than the threshold
            THEN
                Set "need to recompress" to TRUE
                Work out new quality based on either timing or max compress
                    size.
                BREAK out of the loop
            ENDIF
        ENDIF
    ENDFOR
    Free the band allocated to hold an uncompressed current image band.
    IF "abort" is set
    THEN
        CALL DROP WORKING IMAGE INFO specifying new current
            image
        RETURN BLURRING FAILED "aborting"
    ELSEIF "need to recompress" is set to TRUE
    THEN
        (drop the new image, and try recompressing everything . . . )
        CALL DROP WORKING IMAGE INFO specifying new current
            image
    ELSE
        (Things have completed — it is possible to get rid of the original
            current image, replacing it with the new current image)
        CALL TRANSFER NEW IMAGE TO CURRENT IMAGE
    ENDIF
    RETURN OK with "need to recompress" setting
END BLUR BAD BANDS
```

Get Maximum Decompress Time

Given a band decompress time threshold, return the number of bands within the current image that exceed the threshold and what the maximum decompress timing is. All bands should be fixed already (i.e., decompress to the correct current image height). If any band does not have decompress timing info, it will be decompressed to get it. It is assumed that a blank band will never exceed any decompress timing threshold.

```
GET MAXIMUM DECOMPRESS TIME
    Set number-of-exceeding-bands to zero
    Set maximum-decompress-time to zero
    (Ensure all bands have timing information)
    FOR all bands in the current image that exist and have no
        decompress-timing-information
            Add band (and possibly text-detect) to those to be test
                printed
    ENDFOR
    IF the number of bands to be test printed is non-NULL
    THEN
        FOR all bands to be test printed
            Decompress band and get decompression timings
    ENDIF
    (Actually look at band timings now — they should all be there)
    FOR all bands in current image
        IF the band exists
        THEN
            IF the decompress-time is larger than the specified threshold
                given
            THEN
                Record as maximum-decompress-time if greater
                Increment the number-of-exceeding-bands
            ENDIF
        ENDIF
    ENDFOR
    RETURN the maximum-decompress-time and number-of-exceeding-
        bands
END GET MAXIMUM DECOMPRESS TIME
```

Blur Band

Given a band number and a band comprising an uncompressed band buffer, decompress the band, blur it, and then compress it back into the current image. This is performed before a print operation on bad bands. The compress is synchronised so that the decompress time for the band is reported to our caller.

We claim:

1. A method for the compressed storage of an image intended for real-time display, the method comprising the steps of:
   dividing an input uncompressed whole image into a plurality of bands;
   compressing each of said bands using a first compression factor;
   determining invalid ones of said bands that cannot be decompressed within a first predetermined time;
   if the number of said invalid bands is less than a first predetermined number, filtering each of said invalid bands so that its decompression time is less than said first predetermined time;
   if the number of said invalid bands is greater than or equal to said first predetermined number, recompressing said whole image with a second compression factor such that each of said bands can be decompressed in a shorter time interval less than said first predetermined time; and
   storing said compressed bands prior to decompression and subsequent real-time display of said whole image.

2. The method as recited in claim 1 wherein said filtering step includes convolving an invalid band with a predetermined convolution matrix.

3. The method as recited in claim 1 wherein said first predetermined number is chosen to be a proportion of the total number of said bands in the image.

4. The method as recited in claim 1, wherein said filtering step comprises the following sub-steps of:
   decompressing each of said invalid bands;
   filtering each decompressed band; and
   recompressing each filtered band.

5. The method as recited in claim 4, wherein the filtering sub-step comprises convolving said decompressed band with a predetermined convolution matrix.

6. A method for the compressed storage of an image intended for real-time display, the method comprising the steps of:
   (a) dividing an input uncompressed whole image into a plurality of bands;
   (b) compressing each of said bands using a first compression factor;
   (c) determining invalid bands that cannot be decompressed within a first predetermined time;
   if the number of said invalid bands is less than a first predetermined number, filtering each of said invalid bands so that its decompression time is less than said first predetermined time;
   if the number of invalid bands is greater than or equal to said first predetermined number, recompressing the whole image using a second compression factor such that each of said bands can be decompressed in a shorter time interval and applying step (c) to said recompressed image; and
   storing said compressed bands prior to decompression and subsequent real-time display of said whole image.

7. The method as recited in claim 6 wherein said filtering step includes convolving an invalid band with a predetermined convolution matrix.

8. The method as recited in claim 6 wherein said first predetermined number is chosen to be a proportion of the total number of said bands in the image.

9. A method for the compressed storage of an image intended for real-time display, the method comprising the steps of:
   dividing an input uncompressed whole image into a plurality of bands;
   compressing each of said bands using a first compression factor;
   determining invalid ones of said bands that cannot be decompressed within a first predetermined time;
   if the determination result is less than a predetermined threshold, qualitatively reducing each of said invalid bands to have a decompression time shorter than said first predetermined time;
   if the determination result is greater than or equal to said predetermined threshold, recompressing the whole image using a second compression factor such that each of said bands can be decompressed in a time interval shorter than said first predetermined time; and
   storing said compressed bands prior to decompression and subsequent real-time display of said whole image.

10. The method according to claim 9, wherein said qualitatively reducing step comprises the step of blurring a portion of said image contained in each of said invalid bands.

11. The method according to claim 9, wherein said qualitatively reducing step comprises the sub-steps of:
    decompressing each of said invalid bands;
    filtering each decompressed band; and
    recompressing each filtered band.

12. An image processing method comprising the steps of:
    compressing an image input from a predetermined input means and generating first compressed data;
    judging whether or not the first compressed data can be decompressed within a predetermined time;
    if it is Judged that the first compressed data cannot be decompressed in the predetermined time, then:
      if only a portion of said first compressed data needs be changed to be capable of being decompressed in the predetermined time, degrading said portion of said first compressed data; and
    otherwise generating second compressed data based on said input image, the second compressed data being different from the first compressed data and capable of being decompressed in the predetermined time.

13. The method according to claim 12, wherein said input image comprises a predetermined plurality of bands of image data and said judging step is performed on each of said bands.

14. The method according to claim 13, wherein said portion comprises one or more of said predetermined plurality of bands.

15. The method according to claim 12, wherein the first compressed data is generated using a first compression factor, and the second compressed data is generated using a second compression factor different form the first compression factor.

16. An image processing method comprising the steps of:
    dividing an input image into a plurality of bands;
    compressing each of the divided bands using a first compression factor and generating compressed data;

detecting an attribute related to a process time of the compressed data in each of the bands, wherein the attribute represents whether or not the compressed data can be decompressed within a predetermined time, the detection is performed for each of the bands divided in said dividing step, each of the bands being composed of pixels located on a plurality of scan-lines of the input image; and when said detection result indicates that decompression cannot be achieved within the predetermined time, either:

blurring invalid bands having the detected attribute if the number of said invalid bands is less than a predetermined number, and otherwise compressing the image using a second compression factor.

17. An apparatus for compressing an image for storage, said image intended for real-time display, comprising:

means for dividing an input uncompressed whole image into a plurality of bands;

means for compressing each of said bands using a first compression factor;

means for determining invalid ones of said bands that cannot be decompressed within a first predetermined time;

means for, if the number of said invalid bands is less than a first predetermined number filtering each of said invalid bands so that its decompression time is less than said first predetermined time;

means for, if the number of said invalid bands is greater than or equal to said first predetermined number, recompressing said whole image with a second compression factor such that each of said bands can be decompressed in a shorter time interval less than said first predetermined time; and means for storing said compressed bands prior to decompression and subsequent real-time display of said whole image.

18. The apparatus according to claim 17, wherein said filtering means includes means for convolving an invalid band with a predetermined convolution matrix.

19. The apparatus according to claim 17, wherein said first predetermined number is chosen to be a proportion of the total number of said bands in the image.

20. The apparatus as recited in claim 17, wherein said filtering means comprises:

means for decompressing each of said invalid bands;
means for filtering each decompressed band; and
means for recompressing each filtered band.

21. An apparatus for the compressed storage of an image intended for real-time display, comprising:

means for dividing an input uncompressed whole image into a plurality of bands;

means for compressing each of said bands using first compression factor;

means for determining invalid bands that cannot be decompressed within a first predetermined time;

means for filtering each of said invalid bands so that its decompression time is less than said first predetermined time if the number of said invalid bands is less than a first predetermined number, and recompressing the whole image using a second compression factor such that each of said bands can be decompressed in a shorter time interval if the number of invalid bands is greater than or equal to said first predetermined number; and means for storing said compressed bands prior to decompression and subsequent real-time display of said whole image.

22. The apparatus according to claim 21, wherein said filtering means includes means for convolving an invalid band with a predetermined convolution matrix.

23. The apparatus according to claim 21, wherein said first predetermined number is chosen to be a proportion of the total number of said bands in the image.

24. An apparatus for the compressed storage of an image intended for real-time display, comprising:

means for dividing an input uncompressed whole image into a plurality of bands;

means for compressing each of said bands using a first compression factor;

means for determining invalid ones of said bands that cannot be decompressed within a first predetermined time;

means for, if the determination result is less than a predetermined threshold, qualitatively reducing each of said invalid bands to have a decompression time shorter than said first predetermined time;

means for, if the determination result is greater than or equal to said predetermined threshold, recompressing the whole image using a second compression factor such that each of said bands can be decompressed in a time interval shorter than said first predetermined time; and means for storing said compressed bands prior to decompression and subsequent real-time display of said whole image.

25. An image processing apparatus comprising:

means for compressing an image input from a predetermined input means and generating first compressed data;

means for judging whether or nor the first compressed data can be decompressed within a predetermined time;

means for, if it is judged that the first compressed data cannot be decompressed in the predetermined time:

degrading a portion of said first compressed data if only said portion of said first compressed data need be changed to be capable of being decompressed in the predetermined time; and otherwise generating second compressed data based on said input image, the second compressed data being different from the first compressed data and capable of being decompressed in the predetermined time.

26. The apparatus according to claim 25, wherein said input image comprises a predetermined plurality of bands of image data and said judging means judges each of said bands.

27. The apparatus according to claim 25, wherein the first compressed data is generated using a first compression factor, and the second compressed data is generated using a second compression factor different form the first compression factor.

28. An image processing apparatus comprising:

means for dividing an input image into a plurality of bands;

means for compressing each of the divided bands using a first compression factor and generating compressed data;

means for detecting an attribute related to a process time of the compressed data in each of the bands, wherein the attribute represents whether or not the compressed data can be decompressed within a predetermined time, the detection is performed for each of the bands divided by said dividing means, each of the bands being composed of pixels located on a plurality of scan-lines of the input image; and means for, when said detection result indicates that decompression cannot be achieved within the predetermined time, either:

blurring invalid bands having the detected attribute if the number of said invalid bands is less than a predetermined number, and otherwise compressing the image using a second compression factor.

* * * * *